(12) United States Patent
Chen

(10) Patent No.: US 9,959,903 B2
(45) Date of Patent: May 1, 2018

(54) VIDEO PLAYBACK METHOD

(71) Applicant: QNAP SYSTEMS, INC., New Taipei (TW)

(72) Inventor: Chun-Yen Chen, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 258 days.

(21) Appl. No.: 14/689,038

(22) Filed: Apr. 16, 2015

(65) Prior Publication Data

US 2016/0118080 A1 Apr. 28, 2016

(30) Foreign Application Priority Data

Oct. 23, 2014 (TW) .............................. 103136646 A
Dec. 30, 2014 (TW) .............................. 103146379 A

(51) Int. Cl.
| | | |
|---|---|---|
| H04N 5/783 | (2006.01) | |
| G11B 27/00 | (2006.01) | |
| G06T 7/20 | (2017.01) | |
| G11B 27/28 | (2006.01) | |
| G06K 9/00 | (2006.01) | |
| G11B 27/034 | (2006.01) | |
| H04N 5/76 | (2006.01) | |
| G06K 9/32 | (2006.01) | |

(52) U.S. Cl.
CPC ........ *G11B 27/005* (2013.01); *G06K 9/00751* (2013.01); *G06T 7/20* (2013.01); *G11B 27/28* (2013.01); *G06K 2009/3291* (2013.01); *G06T 2207/30232* (2013.01); *G06T 2207/30241* (2013.01); *G11B 27/034* (2013.01); *H04N 5/76* (2013.01)

(58) Field of Classification Search
CPC ........ G06K 9/00751; G06T 7/20; G11B 27/28
USPC ......................................... 386/290, 344, 353
See application file for complete search history.

(56) References Cited

U.S. PATENT DOCUMENTS

| | | | | |
|---|---|---|---|---|
| 6,600,491 | B1* | 7/2003 | Szeliski | G06T 13/80 345/421 |
| 6,611,268 | B1* | 8/2003 | Szeliski | G06T 13/80 345/420 |
| 8,102,406 | B2 | 1/2012 | Peleg et al. | |
| 8,514,248 | B2 | 8/2013 | Peleg et al. | |
| 2006/0257048 | A1* | 11/2006 | Lin | G06K 9/00711 382/276 |
| 2007/0237225 | A1* | 10/2007 | Luo | G06F 17/30811 375/240.12 |
| 2010/0235857 | A1* | 9/2010 | Lestage | G11B 27/036 725/37 |
| 2013/0088592 | A1 | 4/2013 | Falomkin et al. | |
| 2014/0233915 | A1 | 8/2014 | Middleton et al. | |
| 2017/0092330 | A1* | 3/2017 | Tsai | G11B 27/10 |

* cited by examiner

*Primary Examiner* — Helen Shibru
(74) *Attorney, Agent, or Firm* — JCIPRNET

(57) ABSTRACT

A video playback method and a video playback apparatus are provided. The object path extraction module of the video playback apparatus extracts at least one object path from an original video. The video synthesizing module of the video playback apparatus selectively adjusts said object path, so as to synthesize the object path into the synthesis video. The video synthesizing module determines the time length of the synthesis video based on the playback time length set by user, wherein the time length of the synthesis video less than the time length of the original video.

19 Claims, 10 Drawing Sheets

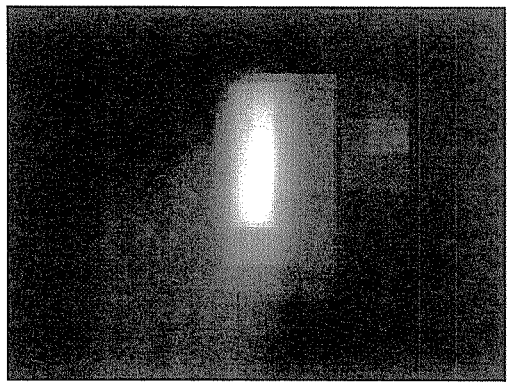
FIG. 5A            FIG. 5B
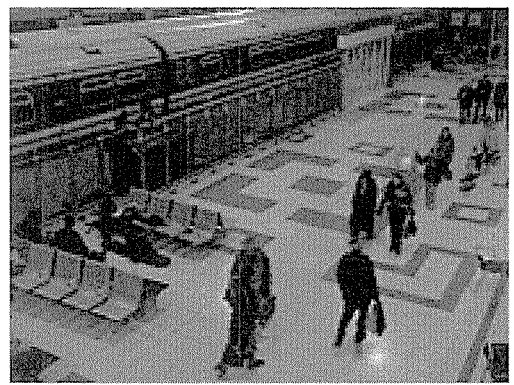
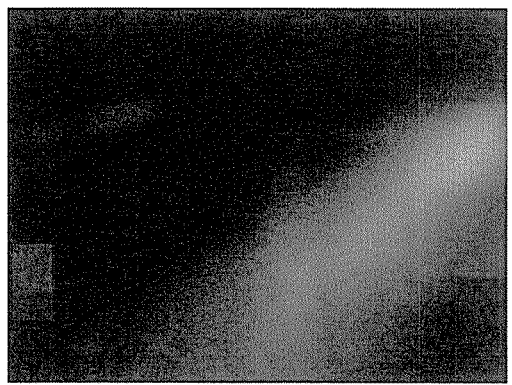
FIG. 6A            FIG. 6B

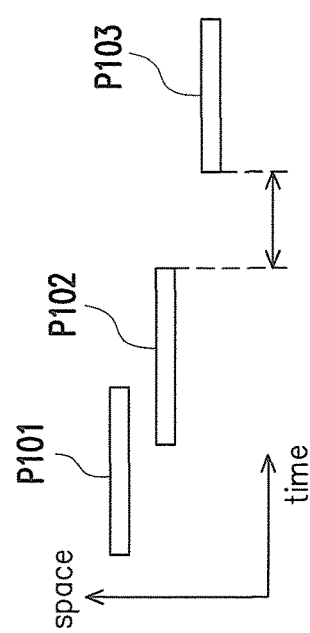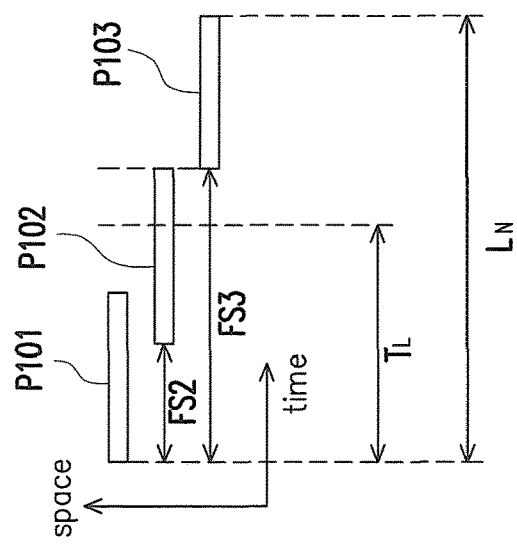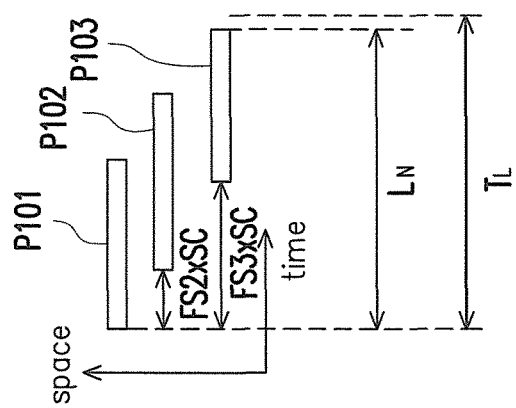

VIDEO PLAYBACK METHOD

CROSS-REFERENCE TO RELATED APPLICATION

This application claims the priority benefit of Taiwan application serial no. 103136646, filed on Oct. 23, 2014 and Taiwan application serial no. 103146379, filed on Dec. 30, 2014. The entirety of the above-mentioned patent applications is hereby incorporated by reference herein and made a part of this specification.

BACKGROUND OF THE INVENTION

1. Field of the Invention

The invention relates to a video apparatus, and particularly relates to a video playback method and apparatus.

2. Description of Related Art

A video surveillance system is capable of obtaining an original video by using a camera module to shoot a scene and storing the original video in a hard disk. For a conventional video playback system, playback is a commonly used function. The playback function allows the user to watch the original video stored in the hard disk. The user may watch a specific time section of the original video, so as to look for an object that draws interest or an abnormal event. However, the time length of the original video may be extremely long. For example, the time length of the original video may be as long as several hours or even days. The user may speed up displaying/watching the original video stored in the hard disk by using a preset constant speed. While a conventional video playback system is capable of reducing the video playback time, the conventional video playback system are unable to display all the objects in the original video within a time length set by the user.

SUMMARY OF THE INVENTION

The invention provides a video playback method capable of reducing a video playback time and displaying all objects that draw interests within a predetermined playback time length.

An embodiment of the invention provides a video playback method, including: providing an original video, wherein the original video is obtained by using a camera module to shoot a scene; providing a playback time length to determine a time length of a synthesis video, wherein a time length of the synthesis video is less than a time length of the original video; extracting at least one object path from the original video; and adjusting the at least one object path selectively to synthesize the at least one object path to the synthesis video.

Based on the above, the video playback method provided in the embodiments of the invention is capable of reducing the playback time of the video. Namely, the time length of the synthesis video is less than the time length of the original video. In the video playback method and the video playback apparatus according to the embodiments of the invention, the time length of the synthesis video is determined according to the playback time length that is set fixedly or is determined dynamically by the user. The video playback method and the video playback apparatus are capable of extracting at least one object path from the original video, and selectively adjusting the object path, so as to synthesize the object path to the synthesis video. Therefore, the video playback method and the video playback apparatus are able to display all the objects that draw interests in the predetermined playback time length.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A is a schematic image illustrating a scene of an office according to an embodiment of the invention.

FIG. 5B is a crowdedness map corresponding to a video shown in FIG. 5A.

FIG. 6A is a schematic image illustrating a scene of a platform in a train station according to another embodiment of the invention.

FIG. 6B is a crowdedness map corresponding to a video shown in FIG. 6A.

FIGS. 10A, 10B, and 10C are schematic views illustrating that an object path rearrangement unit initializes temporal positions of adjusted object paths according to an embodiment of the invention.

DESCRIPTION OF THE EMBODIMENTS

Figure 1:
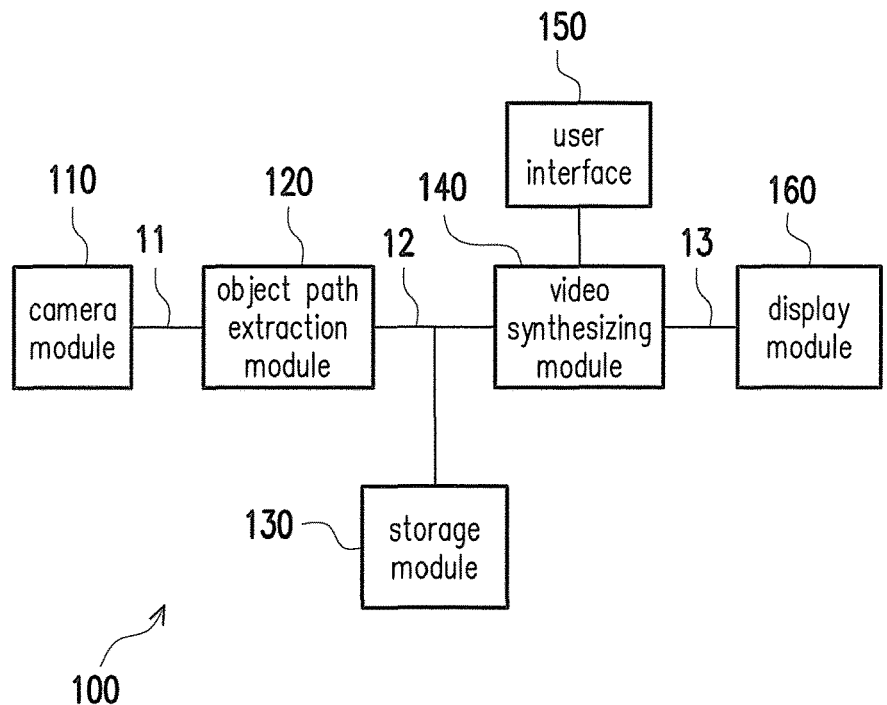
FIG. 1 is a schematic circuit block view illustrating a video playback apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The term "coupling" used throughout the specification (including claims) of the invention may refer to any direct or indirect connecting means. For example, if it is described that a first apparatus is coupled to a second apparatus, it should be understood that the first apparatus may be directly connected to the second apparatus, or the first apparatus may be indirectly connected to the second apparatus through other apparatuses or a connection means. Moreover, wherever possible, elements/components/steps with same reference numerals represent same or similar parts in the drawings and embodiments. Description of elements/components/steps referred by using the same reference numerals or terms in different embodiments may be referred to each other.

The following embodiments serve to describe a video playback method and/or a video playback apparatus. The video playback method and/or video playback apparatus are able to solve an issue of playing a long video captured by a fixed camera within a time length set by the user. In some embodiments (but not limited to the embodiments), before synthesizing a video for playing, the video playback method and/or video playback apparatus may estimate the shortest suitable playback length (suggested time length), and notify the user with the suggested time length. The user may set an expected playback time length with reference to the time length suggested by the apparatus. The video playback method and/or video playback apparatus may generate a synthesis video in the user's expected time length according to the playback time length. The synthesis video may include all objects (or all objects that draw interests) in the original video. A sequence of presence the objects in the synthesis video may be the same as that of the original video. In some embodiments (but not limited to the embodiments), the video playback method and/or video playback apparatus may display overlapped objects in the synthesis video in a semitransparent manner. In some other embodiments (but not limited to the embodiments), the video playback method and/or video playback apparatus may occlude a distant object with a near object, such that the syntheses video looks like a video shot with a camera.

FIG. 1 is a schematic circuit block view illustrating a video playback apparatus 100 according to an embodiment of the invention. The video playback apparatus 100 includes a camera module 110, an object path extraction module 120, a storage module 130, a video synthesizing module 140, a user interface 150, and a display module 160. The camera module 110 is coupled to the object path extraction module 120. The camera module 110 may shoot a scene to obtain an original video 11. The object path extraction module 120 may extract at least one object path 12 from the original video 11. The storage module 130 is coupled to the object path extraction module 120. Based on different requirements of design, the object path extraction module 120 may directly provide the object path 12 to the video synthesizing module 140 and/or store the object path into the storage module 130.

The video synthesizing module 140 is coupled to the object path extraction module 120 and the storage module 130 to receive the object path 12. The video synthesizing module 140 may adaptively adjust the object path 12 according to a predetermined playback time length, so as to synthesize the object path 12 to the synthesis video 13. In addition, the playback time length determines a time length of the synthesis video 13, whereas the time length of the synthesis video 13 is less than a time length of the original video 11. According to different design requirements, the playback time length may be a predetermined value that is set fixedly, or a playback time length value dynamically set by the user.

The user interface 150 is coupled to the video synthesizing module 140. The user interface 150 may transmit a start time $T_b$ and an end time $T_e$ input by the user to the video synthesizing module 140. The user may determine a time range of viewing objects in the original video 11 by setting of the start time $T_b$ and the end time $T_e$. After deciding the time range of the original video 11 to be viewed, the video synthesizing module 140 may synthesize the object path belonging to the time range to the synthesis video 13. In addition, the time length of the synthesis video 13 is compliant with the predetermined playback time length. The time length of the synthesis video 13 is irrelevant of contents of the original video 11. The display module 160 is coupled to the video synthesizing module 140. The display module 160 may play the synthesis video 13 generated by the video synthesizing module 140 for the user's viewing.

Figure 2:
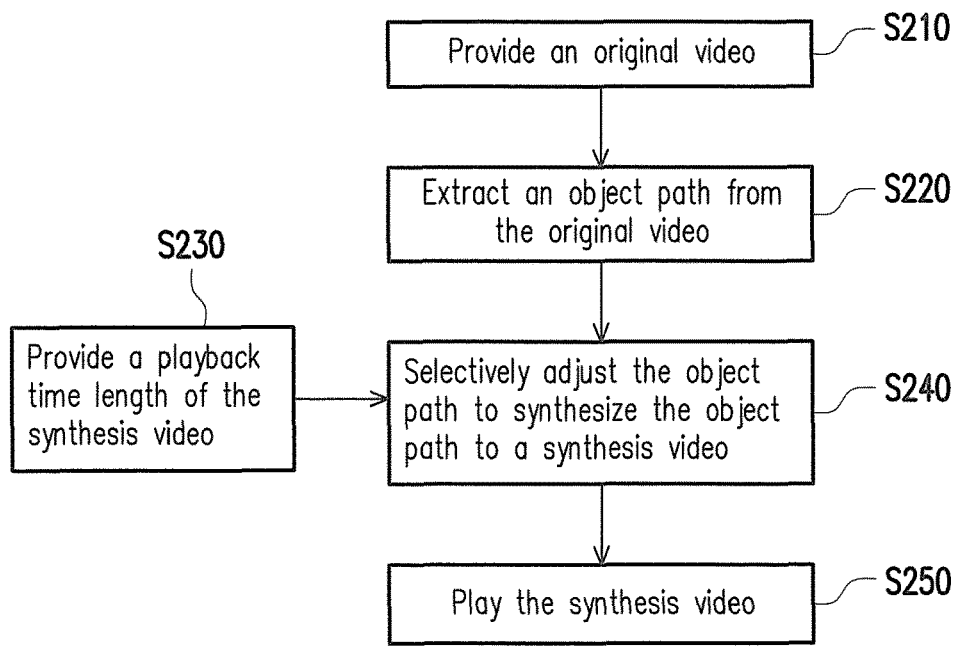
FIG. 2 is a flowchart illustrating a video playback method according to an embodiment of the invention.

FIG. 2 is a flowchart illustrating a video playback method according to an embodiment of the invention. At Step 210, the original video is provided. The original video is obtained by using the camera module to shoot a scene. At Step 220, the object path extraction module extracts at least one object path from the original video. At Step S230, the playback time length is provided to determine the time length of the synthesis video. In addition, the time length of the synthesis video is less than the time length of the original video. At Step S240, the video synthesizing module selectively adjusts the object path, so as to synthesize the object path into the synthesis video. At Step S250, the synthesis video is played for the user's viewing. FIGS. 2 and 1 may be referred to each other. Therefore, the repeated contents will not be reiterated below. In some embodiments, the video playback method shown in FIG. 2 may be implemented in a hardware circuit (e.g. the video playback apparatus 100). In some other embodiments, the video playback method shown in FIG. 2 may be implemented in firmware. The firmware may be operated in a central processing unit, a microcontroller, or other firmware operation platforms. In other embodiments, the video playback method shown in FIG. 2 may be implemented in software. The software may be stored or operated in a computer, a smart phone, or other software operation platforms.

Under some circumstances, the object path may include a first object path and a second object path. After the video synthesizing module 140 selectively adjusts the first object path and the second object path, a playback speed of the first object path may be different from that of the second object path in the synthesis video 13. The playback speed of the object path is determined by a playback time length $T_L$ that is set. For example, in actual use, if the playback time lengths of the first object path and the second object path are less than a threshold length $P_{th}$ (the threshold length $P_{th}$ is less than or equal to the playback time length $T_L$ of the synthesis video 13), the playback speeds of the first object path and the second object path may be the same. If the playback time lengths of the first object path and/or the second object path are greater than the threshold length $P_{th}$, the video synthesizing module 140 may adjust the playback speeds of the first object path and/or the second object path according to the threshold length $P_{th}$, such that the playback speeds of the first object path and the second object path may be different (or the same).

Figures 7A, 7B:
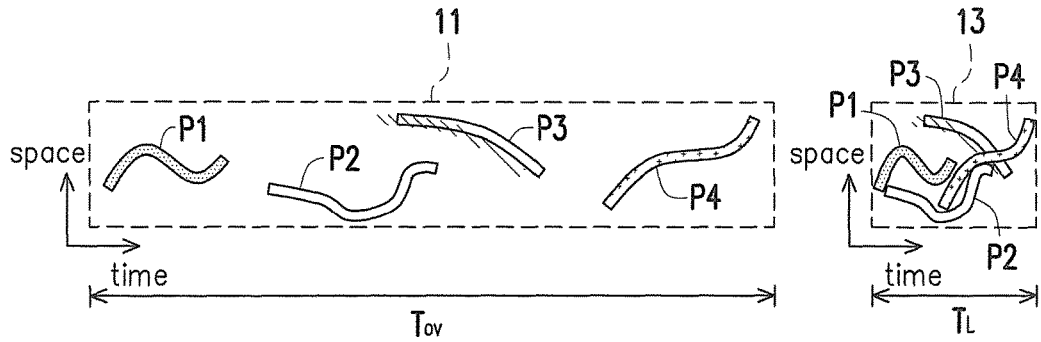
FIGS. 7A and 7B are schematic views illustrating an original video and a synthesis video according to an embodiment of the invention.

Under some circumstances, the object path may include a first object path and a second object path. Also, the time that a first object on the first object path is present in the original video 11 (i.e. the temporal position of the first object in the original video 11) and the time that a second object on the second object path is present in the original video 11 (i.e. the temporal position of the second object in the original video 11) are not overlapped. After the video synthesizing module 140 selectively adjusts the first object path and the second object path, the temporal position of the first object in the synthesis video 13 and the temporal position of the second object in the synthesis video 13 are overlapped. For example, the temporal position of an object on an object path P1 in the original video 11 and the temporal position of an object on an object path P2 in the original video 11 are not overlapped in the time of the original video 11, as shown in FIG. 7A. After the video synthesizing module 140 selectively adjusts the object path P1 and the object path P2, the temporal position of the object on the object path P1 and the temporal position of the object on the object path P2 in the synthesis video 13 are overlapped, as shown in FIG. 7B. It should be noted that a spatial position of the object path in the synthesis video 13 is the same as a spatial position of the object path in the original video 11. For example, spatial positions of the object paths P1, P2, P3, and P4 in the synthesis video 13, as shown in FIG. 7B, are the same as spatial positions of the object paths P1, P2, P3, and P4 in the original video 11, as shown in FIG. 7A. Details concerning FIGS. 7A and 7B will be further elaborated in the subsequent paragraphs.

Figure 3:
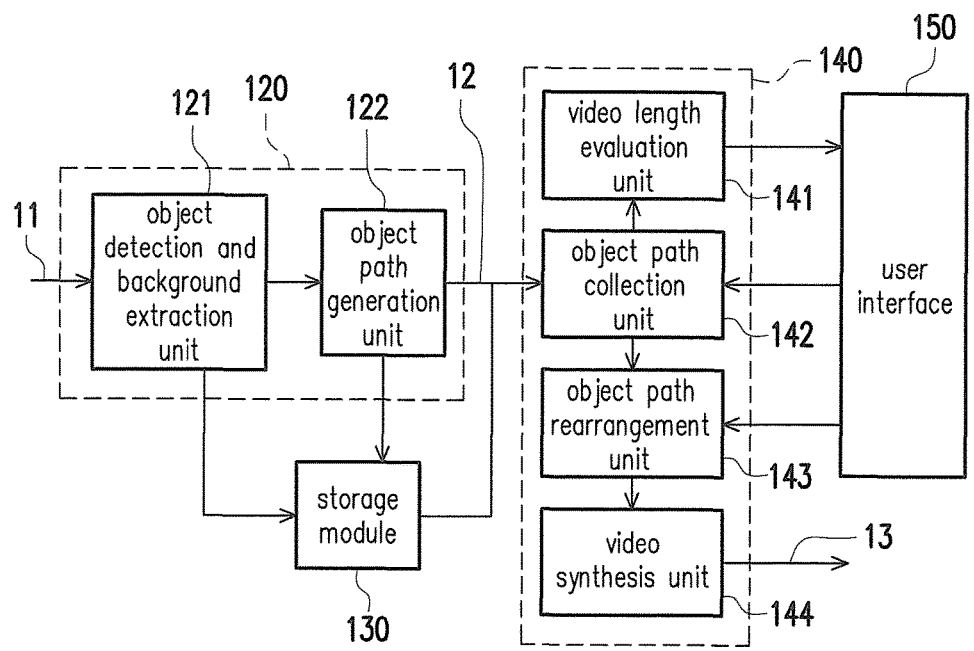
FIG. 3 is a schematic circuit block view illustrating an object path extraction module and a video synthesizing module shown in FIG. 1 according to an embodiment of the invention.

FIG. 3 is a schematic circuit block view illustrating the object path extraction module 120 and the video synthesizing module 140 shown in FIG. 1 according to an embodiment of the invention. The embodiment shown in FIG. 3 may be inferred with reference to relevant description about FIGS. 1 and 2.

Referring FIG. 3, the object path extraction module 120 includes an object detection and background extraction unit 121 and an object path generation unit 122. Before generating the object path, the object is detected. As recited in U.S. Pat. No. 8,599,255, an "object" is defined as a foreground of a scene in a frame of a video stream. On the contrary, a "background" is defined as a static scene that almost remains unchanged or merely changes in slight difference throughout a time sequence of frames of a video. The object detection and background extraction 121 may receive the original video 11 and extracts at least one object and at least one background image in the original video 11. The object detection and background extraction unit 121 may use any algorithm applicable to extract the object and background image from the original video 11. For example (but not limited to the example), in some embodiments, the object detection and background extraction unit 121 may adopt a method as recited in U.S. Pat. No. 8,599,255 or other conventional methods to extract the object and the background image from the original video 11.

Each object and background image has a time stamp corresponding to a source frame thereof. The object detection and background extraction unit 121 may store the background image in the storage module 130. Based on different design requirements, the storage module 130 may include a storage device (e.g. hard drive, solid state drive, etc.), a memory, a buffer, or other data storage media. In some embodiments, the object detection and background extraction unit 121 may store background images of all the source frames in the storage module 130. In some other embodiments, for the purpose of saving the storage space, not every background image is stored. For example, the background image may be chosen and stored after each constant period.

The object path generation unit 122 is coupled to the object detection and background extraction unit 121. The object path generation unit 122 may create the object path 12 according to a relation between the object in the current frame and the object in a previous frame in the original video 11, and store the object path 12 in the storage module 130. After performing object detection to a frame, all the objects detected in the current frame are inspected for their relation with objects in the previous frame. A bounding box of the object may be used to build up the relation. For example, if a bounding box of the object in the current frame is overlapped with a bounding box of the object in the previous frame, the objects present in the sequence of frames are related. The object in the current frame is regarded as a child object, whereas the object in the previous frame is regarded as a parent object.

Figures 4A, 4B, 4C:
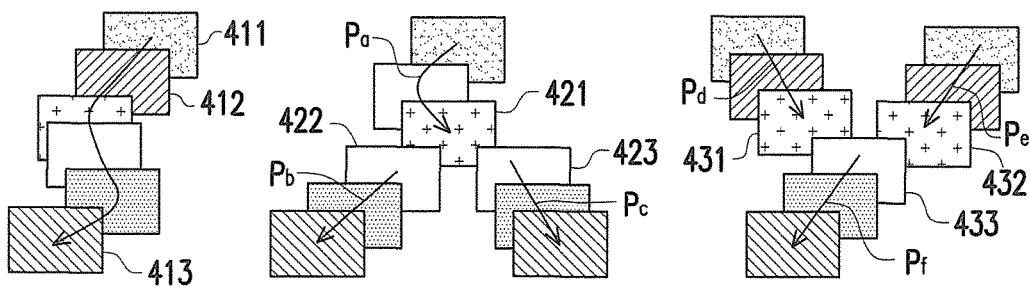
FIGS. 4A, 4B, and 4C are views illustrating a relation between objects shown in different frames.

FIG. 4A illustrates a relation of objects present in different frames. FIG. 4B illustrates a plurality of boxes. The boxes respectively represent bounding boxes of objects present in different frames. Since the boxes (bounding boxes of the objects) are respectively overlapped with the boxes (bounding boxes of the objects) in the previous frame thereof, the boxes (bounding boxes of the objects) shown in FIG. 4A are related. The object path generation unit 122 may combine the related boxes (bounding boxes of the objects) to form the object path.

FIGS. 4B and 4C respectively illustrate relations of objects present in different frames. The boxes shown in FIGS. 4B and 4C respectively represent the bounding boxes of the objects present in different frames. Generation of the object path includes three conditions as follows: (1) creating a new object path; (2) adding an object to a currently available object path; and (3) ending an object path. The three conditions are respectively described in the following with reference to FIGS. 4A, 4B, and 4C.

There are three conditions to create a new object path, which are: (1) the object in the current frame does not have the parent object (the corresponding object in the previous frame); (2) the object in the current frame shares the same parent object with other objects; or (3) the object in the current frame has a plurality of parent objects. The object path generation unit 122 may create a new object path according to an object at least satisfying one of the three conditions, and the object in the current frame is the first object of the new object path. For example, a bounding box 411 of the object shown in FIG. 4A does not have a parent object, so the object path generation unit 122 may set the bounding box 411 of the object as the first object of the newly created object path. A bounding box 422 of the object in the current frame and a bounding box 422 of the object in the current frame shown in 4B share the same parent object (a bounding box 421 of the object). Under such circumstance, the object path generation unit 122 may set the bounding box 422 of the object as the first object of a newly created object path $P_b$, and set a bounding box 423 of the object as the first object of a newly created object path $P_c$. A bounding box 433 of the object in the current frame shown in FIG. 4C has a plurality of parent objects (i.e. bounding boxes 431 and 432 of the objects). Therefore, the object path generation unit 122 may set the bounding box 433 of the object as the first object of a newly created object path Pf.

When the object in the current frame has only one parent object, and the object in the current frame is the only child object of the parent object, the object path generation unit 122 may add the object to the currently available object path that the parent object belongs to. For example, a bounding box 412 of the object shown in FIG. 4A has only one parent object (the bounding box 411 of the object), and the bounding box 412 of the object is the only child object of the parent object (the bounding box 411 of the object). Therefore, the object path generation unit 122 may add the bounding box 412 of the object to the currently available object path that the parent object (the bounding box 411 of the object) belongs to.

When at least one of the following conditions is met, the object path generation unit 122 ends the object path: (1) the last object on the object path does not have a child object; (2) the last object on the object path has more than one child objects; or (3) the last object on the at least one object path shares a child object with other object paths. For example, the last object (i.e. the bounding box 413 of the object) on the object path shown in FIG. 4A does not have a child object, so the object path generation unit 122 ends the object path shown in FIG. 4A. The last object (the bounding box 421 of the object) on the object path $P_a$ shown in FIG. 4B has a plurality of child objects (the bounding boxes 422 and 423 of the objects), so the object generation unit 122 ends the object path $P_a$ shown in FIG. 4B. The last object (the bounding box 431 of the object) on the object path $P_d$ and the last object (the bounding box of the object 432) on the object path $P_e$ shown in FIG. 4C share the same child object, so the object path generation unit 122 ends the object paths $P_d$ and $P_e$ shown in FIG. 4C. When the first object of an object path has a parent object, the object path of the parent object is regarded as a parent object path of the current object path.

After the object path 12 is generated, the object path 12 is stored in the storage module 130 (e.g. a memory or a storage device). The object path 12 includes following data: a time length of the object path 12, a time stamp of the first object on the object path 12, a time shift of each object of the object path 12 with respect to the first object, a position of each object, a size of each object and or the parent object path thereof. Therefore, in some embodiments, the object path 12 may be three-dimensional data including a time information and a two-dimensional position information.

The user interface 150 shown in FIG. 3 may be configured with parameters of a video synthesis process. The parameters include the start time $T_b$ and the end time $T_e$ of the original video 11, a playback time length (expected length) of the synthesis video 13, parameters of an object filter (e.g. sizes, colors movement, etc., of the objects, as described in other embodiments in the following), and/or parameters for generating frames of the synthesis video).

The object synthesis module 140 shown in FIG. 3 includes a video length evaluation unit 141, an object path collection unit 142, an object path rearrangement unit 143, and a video synthesis unit 144. In some embodiments, the object path collection unit 142 may collect a part or all of the object paths from the object path 12 generated by the object path extraction module 120. In some other embodiments, the object path collection unit 142 may collect a part or all of the object paths from the object paths stored in the storage module 130 according to the start time $T_b$ and the end time $T_e$ output by the user interface 150. Under a circumstance where the time length of the original video 11 is overly long, or for the purpose of surveillance application, what the user intends to view is a part of the original video 11, instead of the whole original video 11. The user may use the user interface 150 to set a time length that draws interests (e.g. setting the start time $T_b$ and the end time $T_e$). The object path collection unit 142 may use the start time $T_b$ and the end time $T_e$ provided by the user interface 150 to collect/select a corresponding object path. Given that the time of occurrence and length of a candidate object path in a storage device (e.g. the storage module 130) are respectively referred to as $P_t$ and Pl, if $T_b \le P_t \le T_e$, or $T_b \le P_t + P_l \le T_e$, or $P_t \le T_b$ and $T_e \le P_t + P_l$, the object path collection unit 142 of the object synthesis module 140 may select the candidate object path as the object path that draws the user's interest.

The video length evaluation unit 141 is coupled to the object path collection unit 142 to receive an outcome of collection of the object path collection unit 142. The video length evaluation unit 141 may estimate a suggested time length based on crowdedness of the object paths collected by the object path collection unit 142 at different pixels in a scene. For the user, it is difficult to decide an appropriate video length for a shortened playback time, since the complexity of the original video 11 in different time sections is variable. Therefore, it is necessary to provide a suggestion to help the user decide the appropriate video length. The suggested time length evaluated by the video length evaluation unit 141 may be provided to the user to assist the user in deciding the playback time length of the synthesis video 13.

In this embodiment, the video length evaluation unit 141 may generate a crowdedness map based on the original video 11, so as to describe crowdedness values of the at least one object path at different pixels. The concept of the crowdedness map is to compress all the objects that draw interests in a frame. The crowdedness map may serve as a counter of the object path. An initial value of the crowdedness map in each pixel $C_{ij}$ is zero, wherein $C_{ij}$ refers to a crowdedness at a position (i,j) in a frame. The object path is defined as bounding boxes of a set of objects in a time sequence. If the position (i,j) is in the bounding box on an object path, then, $C_{ij}=C_{ij}+1$. After counting all the bounding boxes of the object paths that draw interests, the crowdedness map is created.

FIG. 5A is a schematic image illustrating a scene of an office according to an embodiment of the invention. FIG. 5B is a crowdedness map corresponding to a video shown in FIG. 5A. As shown in FIG. 5B, a high crowdedness value is present at a central position of the frame (corresponding to a passage in the office shown in FIG. 4A), since all the object paths pass through the passage. On the contrary, FIG. 6B is not as crowded as FIG. 5B. FIG. 6A is a schematic image illustrating a scene of a platform in a train station according to another embodiment of the invention. FIG. 6B is a crowdedness map corresponding to a video shown in FIG. 6A. As shown in FIG. 6B, a distribution of crowdedness values is more even (corresponding to the platform in the train station shown in FIG. 6A). By comparing with FIGS. 5B and 6B, it can be known that the playback time length of the video of FIG. 5A is expected to be longer than that of the video of FIG. 6A.

In this embodiment, the video length evaluation unit 141 may calculate with an equation of $$F_n = \left\lceil \frac{C_m}{C_{th}} \right\rceil \text{ and } T_p = \left\lceil \frac{F_n}{R_f} \right\rceil,$$

wherein $F_n$ refers to the suggested number of frames, $C_m$ refers to associated values of the crowdedness values in the crowdedness map, $C_{th}$ refers to a threshold value, $T_p$ refers to the suggested time length, and $R_f$ refers to a frame rate of the synthesis video. A maximal value in the crowdedness map is associated with how an appropriate time length is determined. The threshold value $C_{th}$ is greater than 0 and less than the associated value $C_m$. When the associated value $C_m$ is less than the threshold value $C_{th}$, the user may easily distinguish different objects in a scene. To eliminate the influence of noises, the associated value $C_m$ and the threshold value $C_{th}$ may be determined according to the design requirements. For example (but not limited to the example), the associated value $C_m$ may be an average value of the crowdedness values of all the pixels in the crowdedness map. In some other embodiments, the associated value $C_m$ is an average value of a range which is top 10% to top 50% of the crowdedness values of the crowdedness map. The associated value $C_m$ may be an average value of the top 50% of the crowdedness values in the crowdedness map ordered in a descending sequence. In other embodiments, the associated value $C_m$ may be an average value of the top 20% of the crowdedness values or an average value of the top 10% of the crowdedness values. In some embodiments, the threshold value $C_{th}$ may be set at 72 to meet the visual perception of human beings.

The object path rearrangement unit 143 may rearrange the object paths in the synthesis video 13 according to the sequence of presence of the object paths selected by the object path collection unit 142. For example, FIGS. 7A and 7B are schematic views illustrating an original video and a synthesis video according to an embodiment of the invention. In FIGS. 7A and 7B, a vertical axis indicates space (a position of an object), while a horizontal axis indicates time. Here, it is assumed that in the original video 11, the object paths P1, P2, P3, and P4 show up at different time. The object path rearrangement unit 143 may rearrange the object paths P1, P2, P3, and P4 in the synthesis video 13 according to a sequence of presence of the object paths P1, P2, P3, and P4 in the original video 11. According to FIGS. 7A and 7B, it can be seen that the time length $T_L$ of the synthesis video 13 is shorter than a time length $T_{ov}$ of the original video 11. Therefore, the video playback method and video playback apparatus 100 of this embodiment are capable of reducing the video playback time.

Figure 8:
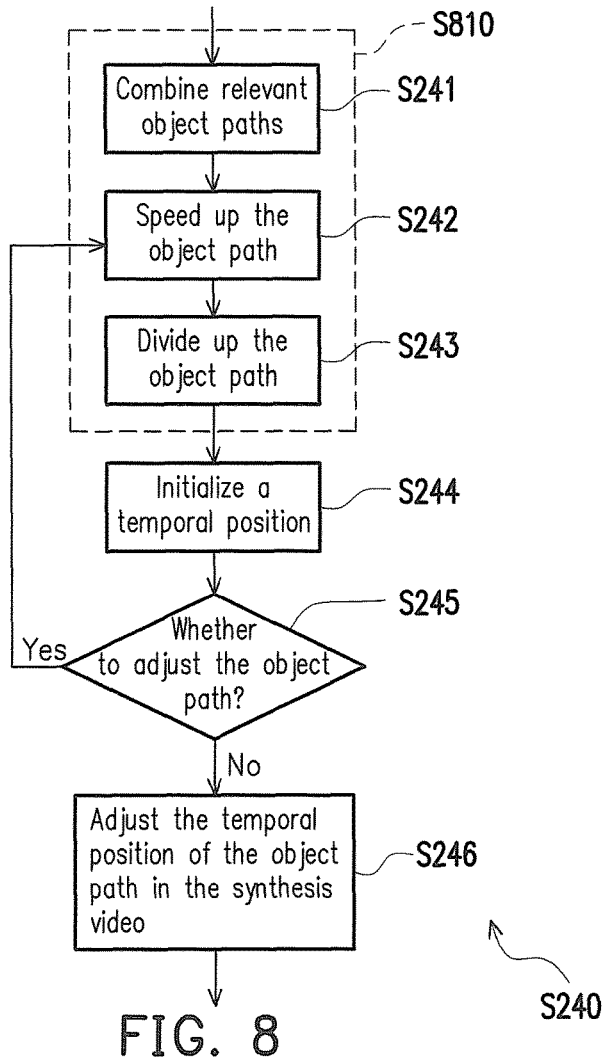
FIG. 8 is a flowchart illustrating details of steps in Step S240 shown in FIG. 2 according to an embodiment of the invention.

FIG. 8 is a flowchart illustrating details of steps in Step S240 shown in FIG. 2 according to an embodiment of the invention. In the embodiment shown in FIG. 8, Step S240 includes Sub-steps S810, S244, S245, and S246. At Step S810, the object path rearrangement unit 143 may selectively adjust the object path selected by the object path collection unit 142 to obtain at least one adjusted object path. For example (but not limited to the example), Step S810 of this embodiment includes Steps S241, S242, and S243.

At Step S241, the object path and a parent object path thereof are combined to serve as the adjusted object path when the object path has the parent object path. When a plurality of objects cross each other, the object path is divided into a plurality of object paths. For example, a circumstance shown in FIG. 4C may be that two objects move from different positions to the same position, and a circumstance shown in FIG. 4B may be that two objects move from the same position to different positions. Thus, the first step of object path rearrangement is to combine relevant object paths (Step S241 shown in FIG. 8) to restore a complete story of the crossing object paths. Since each object path records the parent object path thereof, the information is consequently used to construct an inheriting tree structure to combine all the opposite object paths. For example, the object path rearrangement unit 143 may combine the object paths $P_a$, $P_b$, and $P_c$ shown in FIG. 4B into an individual object path at Step S241. The individual object path is also regarded as the adjusted object path herein. The object path rearrangement unit 143 may also combine the object paths $P_d$, $P_e$, and Pf shown in FIG. 4C into an adjusted object path at Step S241. In addition, an object path without a parent object path may also be regarded as an adjusted object path.

The next step in object path rearrangement is to put all the individual object paths in the synthesis video 13. When the user wishes to play in a compressed manner within a short period of time, the length of the object path may exceed the time length of the synthesis video 13. Therefore, the embodiment shown in FIG. 8 uses two ways to reduce the object path. The two ways are respectively a process of object path speedup, as shown in Step S242 in FIG. 8, and a process of object path splitting, as shown in Step S243 in FIG. 8.

When a time length of the adjusted object path provided at Step S241 is greater than the threshold length $P_{th}$, the object path rearrangement unit 143 may speed up a playback speed of the adjusted object path provided at Step S241 according to a speedup factor at Step S242, so as to reduce the time length thereof. The threshold length $P_{th}$ is less than or equal to the playback time length $T_L$ of the synthesis video 13, and the speedup factor $S_p$ is a real number. The embodiment is not intended to limit the embodiments of the threshold length $P_{th}$ and the speedup factor $S_p$. For example (but not limited to the example), the threshold length $P_{th}$ may be greater than or equal to a quarter of the playback time length $T_L$ of the synthesis video 13. In this embodiment, the threshold length $P_{th}$ is set to be equivalent to a half of the playback time length $T_L$. In the following, the embodiment of the speedup factor SP is described with different embodiments.

In some embodiments, speeding up the object path concerns a ratio value between a time length $P_l$ of the object path and the time length $T_L$ of the synthesis video 13. If the time length $P_l$ of the object path is a half of the time length $T_L$ of the synthesis video 13, the object path is reduced. The object path rearrangement unit 143 may calculate with an equation $S_p=(P_l/P_{th})$ at Step S242 to obtain the speedup factor $S_p$. In this embodiment, the threshold value $P_{th}=(T_L/2)$. When the speedup factor $S_p$ is greater than the maximal speedup value $S_{max}$, the speedup factor is set at the maximal speedup value $S_{max}$, wherein the maximal speedup value $S_{max}$ is greater than 1 and less than 4. When the speedup factor $S_p$ is less than 1, the speedup factor $S_p$ is set at 1. Therefore, if the time length $P_l$ of the object path is less than a half of the time length $T_L$ of the synthesis video 13, the object path is not reduced.

It can thus be known that the playback speed of the object path is determined by the playback time length $T_L$ that is set. For example, in actual use, if the playback time lengths of the first object path and the second object path are less than the threshold length $P_{th}$, the playback speeds of the first object path and the second object path may be the same as the playback speeds thereof in the original video 11. Namely, the playback speeds of the first object path and the second object path may not need to speed up. If the playback time lengths of the first object path and/or the second object path are greater than the threshold length $P_{th}$, the video synthesizing module 140 may adjust the playback speeds of the first object path and/or the second object path according to the threshold length $P_{th}$, such that the playback speeds of the first object path and the second object path may be different (or the same).

In some other embodiments, the object path crossing a hot zone of the crowdedness map needs to speed up to reduce overlapping with other object paths. Here, the "hot zone" is defined as follows: when the crowdedness value in an area is relatively greater than the crowdedness values in other areas, the area may be regarded as a hot zone. The crowdedness map is used to calculate a representative crowdedness value $C_p$ of the object path in the crowdedness map. In this embodiment, the bounding boxes of all the object paths are projected to the crowdedness map, and then the representative crowdedness value $C_p$ of the crowdedness map is found in the projection area. In this embodiment, it is assumed that the representative crowdedness value $C_p$ of an object path is the maximal crowdedness value of the object path in the crowdedness map. When the representative crowdedness value $C_p$ of the object path in the crowdedness map is greater than or equal to a crowdedness upper limit $C_U$, the object path rearrangement unit 143 may set the speedup factor $S_p$ at the maximal speedup value $S_{max}$ at Step S242, wherein the crowdedness upper limit $C_U$ and the maximal speedup value $S_{max}$ are real numbers. The crowdedness upper limit $C_U$ and the maximal speedup limit $S_{max}$ may be determined according to the design requirements. When the representative crowdedness value $C_p$ is less than or equal to a crowdedness lower limit $C_L$, the object path rearrangement unit 143 may set the speedup factor $S_p$ at 1 at Step S242, wherein the crowdedness lower limit $C_L$ is a real number and less than the crowdedness upper limit $C_U$. The crowdedness lower limit $C_L$ may be determined according to the design requirements. When the representative crowdedness value $C_p$ is greater than the crowdedness lower limit $C_L$ and is less than the crowdedness upper limit $C_U$, the object path rearrangement unit 143 may set the speedup factor $S_p$ as $[(C_p-C_L)/(C_U-C_L)]*(S_{max}-1)+1$ at Step S242.

In other embodiments, the object path rearrangement unit 143 may calculate a first factor with $S_g=(P_l/P_{th})$ at Step S242 to obtain the speedup factor $S_p$. In this embodiment, the threshold value $P_{th}=(T_L/2)$. If the first factor $S_g$ is greater than the maximal speedup value $S_{max}$, the object path rearrangement unit 143 may set the first factor $S_g$ at the maximal speedup value $S_{max}$, wherein the maximal speedup value $S_{max}$ is a real number greater than 1 and less than 4. If the first factor $S_g$ is less than 1, the object path rearrangement unit 143 sets the first factor $S_g$ at 1. If the representative crowdedness value $C_p$ of the object path in the crowdedness map is greater than or equal to the crowdedness upper limit $C_U$, the object path rearrangement unit 143 sets a second factor $S_c$ at the maximal speedup value $S_{max}$. If the representative crowdedness value $C_p$ is less than or equal to the crowdedness lower limit $C_L$, the object path rearrangement unit 143 may set the second factor $S_c$ at 1. If the representative crowdedness value $C_p$ is greater than the crowdedness lower limit CP and is less than the crowdedness upper limit $C_U$, the object path rearrangement unit 143 may set the second factor as $[(C_p-C_L)/(C_U-C_L)]*(S_{max}-1)+1$. The object path rearrangement unit 143 may choose a greater one of the first factor $S_g$ and the second number $S_c$ at Step S242 to serve as the speedup factor $S_p$.

After finishing accelerating the object path (Step S242), some object paths may still be in a time length longer than the playback time length $T_L$ of the synthesis video 13. To deal with the extremely long object path, the extremely long object path may be divided into several shorter sub-paths at Step S243. At Step S243, the object path rearrangement unit 143 may divide the object path into a plurality of sub-paths to serve as the adjusted object paths when the time length $P_l$ of the object path after the process at Step S242 is longer than the threshold length $P_{th}$. The object path arrangement unit 143 may adjust a frame shift of a first sub-path of the sub-paths to other sub-paths to reduce an overlapped area of the sub-paths.

Figure 9:
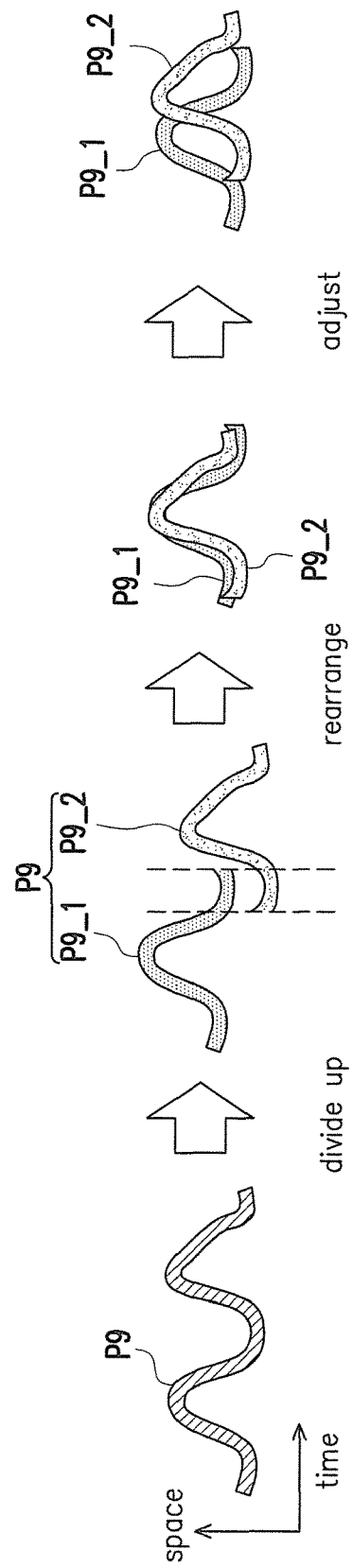
FIG. 9 is a flowchart illustrating details of operations of Step S243 shown in FIG. 8 according to an embodiment of the invention.

For example, FIG. 9 is a flowchart illustrating details of operations of Step S243 shown in FIG. 8 according to an embodiment of the invention. Here, it is assumed that a time length of an object path P9 is longer than the threshold length $P_{th}$. The object path rearrangement unit 143 may divide the object path P9 into a plurality of sub-paths, such as sub-paths P9_1 and P9_2, at Step S243. The adjacent sub-paths P9_1 and P9_2 in time sequence is slightly overlapped in a temporal space (as shown in FIG. 9). Namely, a tail end part of the first sub-path P9_1 is the same as a head end part of the second sub-path P9_2. The object path rearrangement unit 143 may rearrange the time of the sub-paths P9_1 and P9_2 to advance the time of occurrence of the sub-path P9_2 that occurs later to become the same as the time of occurrence of the sub-path P9_1.

After the sub-paths P9_1 and P9_2 are rearranged in time, the sub-paths P9_1 and P9_2 may be largely overlapped in a locational space under some circumstances (e.g. wandering objects). To solve this issue, a time shift is added to each sub-path. This issue may be represented as a minimum cost problem by using a formula. A cost function E(t) is defined as $$E(t) = \sum_{k=1}^{N} \sum_{i=1}^{k} O(P_i(t_i), P_k(t_k)).$$

In addition, $t=\{t_0, t_1, \ldots, t_N\}$ represents a set of frame shifts of each sub-path corresponding to the first sub-path P9_1. In addition, $t_0=0$, $t_0 \le t_1 \le \ldots \le t_N$, and N is the number of sub-paths. For example, a frame shift of the first sub-path P9_1 is $t_0$, and a frame shift of the second sub-path P9_2 is $t_1$. $P_i(t_i)$ is an $i^{th}$ sub-path having a frame shift Ti, and a function $O(P_x,P_y)$ serves to calculate an overlapped area between the sub-paths $P_x$, and $P_y$. To minimize the cost function E(t), the following conditions need to be met: $R \times T_L > L_N$, wherein $L_N$ is a time range of all the sub-paths, and R is a constant less than 1. The less the R value is, the shorter the time length of the sub-paths becomes. Therefore, the object path rearrangement unit 143 may adjust a frame shift of the first sub-path P9_1 of the sub-paths to the sub-path P9_2 to reduce the overlapped area of the sub-paths.

After Step S243 is finished, the object path rearrangement unit 143 may proceed to Step S244. Based on the sequence of presence of the object paths in the original video 11, at Step S244, the object path rearrangement unit 143 may initialize temporal positions of the adjusted object paths provided at Step S243 in the synthesis video 13. First, all the object paths are rearranged. If there is a gap in time between the first object path and the second object path of the adjusted object paths, the object path rearrangement unit 143 may advance the time of the later one of the first object path and the second object path, and makes the time of the later one later than the time of the earlier one of the first object path and the second object path. The object path rearrangement unit 143 then respectively multiplies the time shifts of the adjusted object paths with the same adjustment value, such that the time range of the adjusted object paths is included in the range of the playback time length of the synthesis video 13.

For example, FIGS. 10A, 10B, and 10C are schematic views illustrating that the object path rearrangement unit 143 initializes the temporal positions of the adjusted object paths according to an embodiment of the invention. FIG. 10A illustrates object paths P101, P102, and P103. Also, there is a gap in time between the object paths P102 and P103. Thus, referring to FIG. 10B, the object path rearrangement unit 143 may advance the time of the object path P103 at Step S244, such that there is no gap between the object paths P102 and P103. The time of the advanced object path P103 is later than the time of the object path P102. As shown in FIG. 10B, the time range $L_N$ of all the object paths exceeds the playback time length $T_L$ of the synthesis video 13. The object path rearrangement unit 143 may obtain an adjustment value SC2 (a real number less than 1) of the object path P102 according to a frame shift FS2 of the object path P102, a time length of the object path P102, and the playback time length $T_L$ of the synthesis video 13. In addition, when the frame shift FS2 is multiplied with the adjustment value SC2, the object path 102 is included in the range of the playback time length $T_L$ of the synthesis video 13. The object path rearrangement unit 143 may also obtain an adjustment value SC3 (a real number less than 1) of the object path P103 according to a frame shift FS3 of the object path P103, a time length of the object path P103, and the playback time length $T_L$ of the synthesis video 13. In addition, when the frame shift FS3 is multiplied with the adjustment value SC3, the object path 103 is included in the range of the playback time length $T_L$ of the synthesis video 13. Then, the object path rearrangement unit 143 may choose a minimal value among the adjustment values (e.g. SC2 and SC3) as the adjustment value SC. The object adjustment rearrangement unit 143 multiplies the time shifts FS2 and FS3 of the object paths P102 and P103 with the same adjust value SC respectively at Step S244, such that the time range $L_N$ of the object paths P101, P102, and P103 are included in the range of the playback time length $T_L$ of the synthesis video 13, as shown in FIG. 10C. Since the time shifts of all the object paths are multiplied with the same adjustment value, the sequence of presence of the object paths in the original video 11 may be retained.

If it is determined at Step S245 that there is still an object path having a time length longer than the threshold length $P_{th}$ or the time range $L_N$ of all the object paths exceeds the playback time length $T_L$ of the synthesis video 13, Steps S242, S243, S244, and S245 are repeated again.

The last step of object path rearrangement is to optimize the positions of the object paths in a time domain (Step S246 shown in FIG. 8). Based on overlapping of the object paths provided at Step S244 in the synthesis video 13, the object path rearrangement unit 143 adjusts the temporal positions of the object paths in the synthesis video 13 at Step S246. For example, the object path rearrangement unit 143 may adjust the frame shift between the first object path of the object paths and other object paths, so as to reduce the overlapped area of the object paths. A purpose of the optimizing process is to obtain the best positions of the object paths in the time domain. The best positions of the object paths indicate that the object paths have a minimal overlapped area. Again, the cost function $$E(t) = \sum_{k=1}^{x}\sum_{i=1}^{k} O(P_i(S_i), P_k(S_k))$$

is used, wherein an outcome or object path rearrangement is a set of frame shifts $S=\{S_0, S_1, \ldots, S_x\}$ corresponding to the object paths, wherein $S_0=0$, $S_0 \leq S_1 \leq \ldots \leq S_x$, and x refers to the number of the object paths. $P_i(t_i)$ is the $i^{th}$ object path having the frame shift Ti, and the function $O(P_x, P_y)$ calculates the overlapped area between the sub-paths $P_x$ and $P_y$.

Referring to FIG. 3, the video synthesis unit 144 is coupled to the object path rearrangement unit 143 to receive an outcome of rearrangement of the object path rearrangement unit 143. The video synthesis unit 144 may synthesize the object paths provided by the object path rearrangement unit 143 and the background images provided by the storage module 130 to form the synthesis video 13. When a frame of the synthesis video 13 includes a plurality of objects, the objects may be from different frames in the original video 11. For example, with the two object paths $P_1$ and $P_2$ provided, and assuming that $T_b^1$ and $T_b^2$ are respectively the start time of the object paths $P_1$ and $P_2$ in the original video 11 and the corresponding frame shifts after rearrangement of the object path rearrangement unit 143 are $S_1$ and $S_2$ respectively, if $S_1+k=S_2+m$, the $k^{th}$ frame on the object path $P_1$ and the $m^{th}$ frame on the object path $P_2$ are displayed in the same frame of the synthesis video 13. Time stamps of the two objects are $T_b^1+k$ and $T_b^2+m$. $T_b^1+k$ and $T_b^2+m$ are different, unless $T_b^1-T_b^2=S_1-S_2$.

To synthesize the video, the first step is to confirm which objects are in the video frame. Assuming that the synthesis video has N frames in the time length $T_L$ set by the user, an object in the $k^{th}$ frame on the object path $P_i$ is an object of the $(k+S_i)^{th}$ frame in the synthesis video 13. In addition, $S_i$ is a frame shift of the object path $P_i$, and $k+S_i \leq N$. The video playback apparatus 100 may synthesize all the objects that draw interests to the synthesis video 13.

The background images are another key factor for synthesizing the video. In the video synthesis process, the objects are pasted to the background image to generate a video frame. In this embodiment, a choice on the background image is based on time stamps of the objects in the frame. For a video frame including n objects $O=\{O_0, O_1, \ldots, O_{n-1}\}$, the time stamps of the objects may be $T=\{T_0, T_1, \ldots, T_{n-1}\}$. The video synthesis unit 144 may choose one of the plurality of background images stored in the storage module 130 having a time stamp closest to a time stamp value $T^{bg}$, so as to synthesize the video frame. In addition, the time stamp value $T^{bg}$ is calculated based on the time stamps of the objects in the video frame. For example (but not limited to the example), the time stamp value $T^{bg}$ is equivalent to an average value of the time stamps of the objects in the video frame, i.e.

$$T^{bg} = \frac{1}{n}\sum_{k=0}^{n} T_k.$$

In other applications, the time stamp value $T^{bg}$ may also be a middle value of the time stamps T of the objects or one of the time stamps T. For example, if an object $O_i$ is a significant object, the object synthesis unit 144 may choose the background image having a time stamp closest to $T_i$.

After choosing the background image, the video synthesis unit 144 may perform object and background blending. The embodiment does not specifically impose a limitation on the way of blending the objects and backgrounds. For example, in some embodiments, the video synthesis unit 144 may use a Gaussian blending method to blend the background images and object images of the object paths. The object images (bounding box areas) may include the complete objects and a part of the background of the original video 11. Therefore, if the object images are directly pasted to the background images, boundaries of the object images may be very obvious or unnatural. To solve this issue, the Gaussian blending method may be used in the embodiment to blend the background and object images. The Gaussian blending method applied to the object and background images is defined as $F'_{ij}=w_{ij}*F_{ij}+(1-w_{ij})*B_{ij}$, wherein $F_{ij}$ is a pixel of the object image at the position (i,j), $B_{ij}$ is a pixel of the background image at the position (i,j), $F'_{ij}$ is a pixel of the object image after Gaussian blending, and $w_{ij}$ is a weight value of Gaussian blending. When th≤|$F_{ij}-B_{ij}$|, $w_{ij}$=1. Otherwise, $$w_{ij} = e^{-\frac{(|F_{ij}-B_{ij}|-th)^2}{b}}.$$

In addition, th is a threshold value for determining background similarity, and b is a constant value for Gaussian function.

In some other embodiments, the video synthesis unit 144 may use an Alpha blending method to blend the overlapped object images on the object paths in a semitransparent manner. When a frame of the synthesis video 13 includes a plurality of objects, there may be an overlapped area between the object images. Overlapping one object with another object may result in loss of object information. The Alpha blending method is used to display overlapped objects in a semitransparent manner to avoid loss of information. The Alpha blending method is represented in a formula $$F'_{ij} = \frac{1}{n}\sum_{k=0}^{n} F^k_{ij},$$

wherein $F'_{ij}$ is a pixel located at the position (i,j) after Alpha blending, n is the number of overlapped objects at the position (i,j), while $F_{ij}^k$ is a pixel of the $k^{th}$ object at the position (i,j) of the overlapped area.

In other embodiments, the video synthesis unit 144 may use a z-ordering to generate the synthesis video 13. The idea of z-ordering is to cover a distant object with a near object. Such method requires defining a z-distance (value of z-depth) of an object in a two-dimensional image. The video synthesis unit 144 may calculate values of z-depth of the objects on the object paths. Based a descending sequence of the values of z-depth of the objects, the video synthesis unit 144 may paste the objects on the background image in sequence. In other words, an object with the greatest value of z-depth is pasted on the background image first, while an object with the least value of z-depth is pasted on the background image last.

Figure 11:
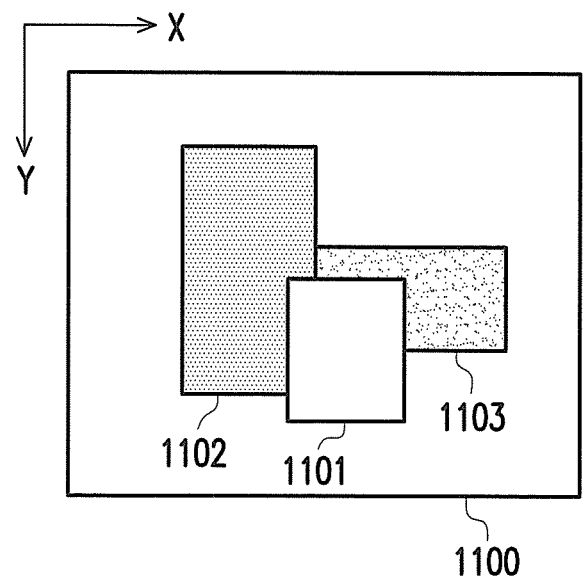
FIG. 11 is a schematic view illustrating an image obtained by a conventional camera according to an embodiment of the invention.

For an image captured with a conventional camera, a value of z-depth of an object is in inverse proportion to a maximal value on y-axis of the object. For example, FIG. 11 is a schematic view illustrating an image obtained by a conventional camera according to an embodiment of the invention. In FIG. 11, a vertical axis indicates a y-axis of an image frame 1100, while a horizontal axis indicates an x-axis of the image frame 1100. In addition, the origin of the x-y coordinate system is at the upper left corner of the image frame 1100. The closer an object is to the camera module 110 (i.e. smaller value of z-depth), the greater the maximal value on y-axis of the object (i.e. a value on y-axis at the lower edge of the object image) becomes. Taking FIG. 11 as an example, a maximal value on y-axis of an object 1101 is greater than a maximal value on y-axis of an object 1102, and the maximal value on y-axis of the object 1102 is greater than a maximal value on y-axis of an object 1103. It can thus be known that a value of z-depth of the object 1101 is smaller than a value of z-depth of the object 1102, while the value of z-depth of the object 1102 is smaller than a value of z-depth of the object 1103. After calculating the values of z-depth of the objects, the objects 1101, 1102, and 1103 are ordered according to their values of z-depth. Based on a descending sequence of the values of z-depth of the objects 1101, 1102, and 1103, the video synthesis unit 144 may firstly paste the object 1103 on the background image, then paste the object 1102 on the background image, and then paste the object 1101 on the background image.

Figure 12:
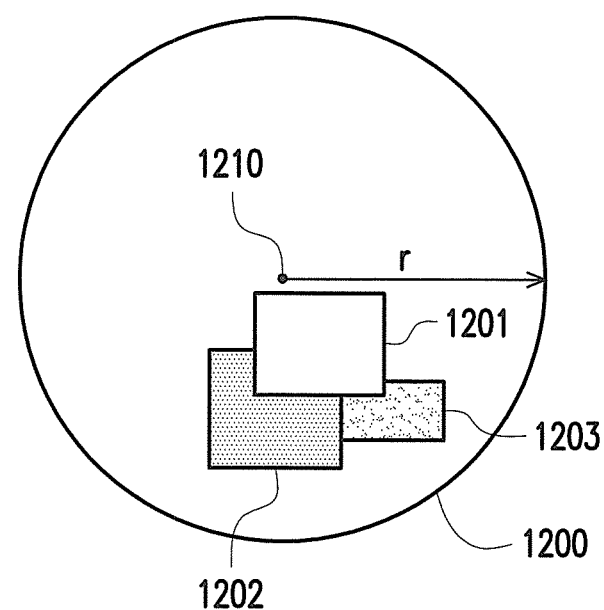
FIG. 12 is a schematic view illustrating an image obtained by a fisheye camera according to an embodiment of the invention.

As for an image captured with a fisheye camera, a value of z-depth of an object is in direct proportion to a minimal distance from the object to an image centroid. For example, FIG. 12 is a schematic view illustrating an image obtained by a fisheye camera according to an embodiment of the invention. In FIG. 12, a fisheye image frame 1200 is a circle having a radius r. The closer an object is to the camera module 110 (i.e. smaller value of z-depth), the smaller a minimal distance from the object to an image centroid of the image frame 1210 becomes. Taking FIG. 12 as an example, a minimal distance from an object 1201 to the image centroid 1210 is smaller than a minimal distance from an object 1202 to the image centroid 1210, and the minimal distance from the object 1202 to the image centroid 1210 is smaller than a minimal distance from an object 1203 to the image centroid 1210. It can thus be known that a value of z-depth of the object 1201 is smaller than a value of z-depth of the object 1202, while the value of z-depth of the object 1202 is smaller than a value of z-depth of the object 1203. After calculating the values of z-depth of the objects, the objects 1201, 1202, and 1203 are ordered according to their values of z-depth. Based on a descending sequence of the values of z-depth of the objects 1201, 1202, and 1203, the video synthesis unit 144 may firstly paste the object 1203 on the background image, then paste the object 1202 on the background image, and then paste the object 1201 on the background image.

Figure 13:
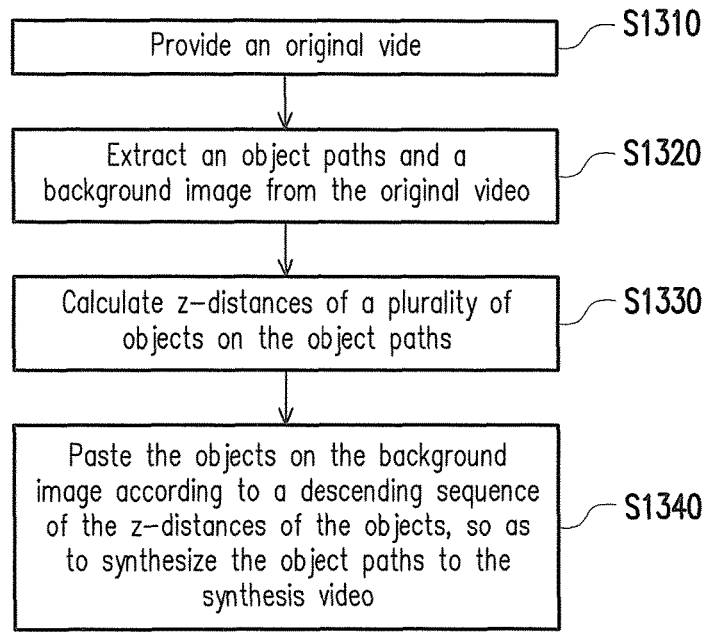
FIG. 13 is a flowchart illustrating a video playback method according to another embodiment of the invention.

FIG. 13 is a flowchart illustrating a video playback method according to another embodiment of the invention. At Step S1310, the original video is provided. The original video is obtained by using the camera module to shoot a scene. At Step 1320, the object path extraction module extracts at least one object path and the background image from the original video. Details regarding Steps 1310 and 1320 shown in FIG. 13 may be referred to the description about Steps S210 and S220 shown in FIG. 2. At Step S1330, the values of z-depth of the objects on the object paths are calculated. Based on the descending sequence of the values of z-depth of the objects, the objects are pasted on the background image in sequence at Step 1340, so as to synthesize the object paths to the synthesis video. In addition, the time length of the synthesis video is less than the time length of the original video. Details regarding synthesizing the object paths to the synthesis video at Step 1340 may be referred to the description about Step S240 shown in FIG. 2. Therefore, no further details in this respect will be reiterated below.

In some embodiments, the values of z-depth of the objects are in inverse proportion to the maximal values on y-axis of the objects. In some embodiments, the values of z-depth of the objects are in direct proportion to the minimal distances from the objects to the image centroid.

Figure 14:
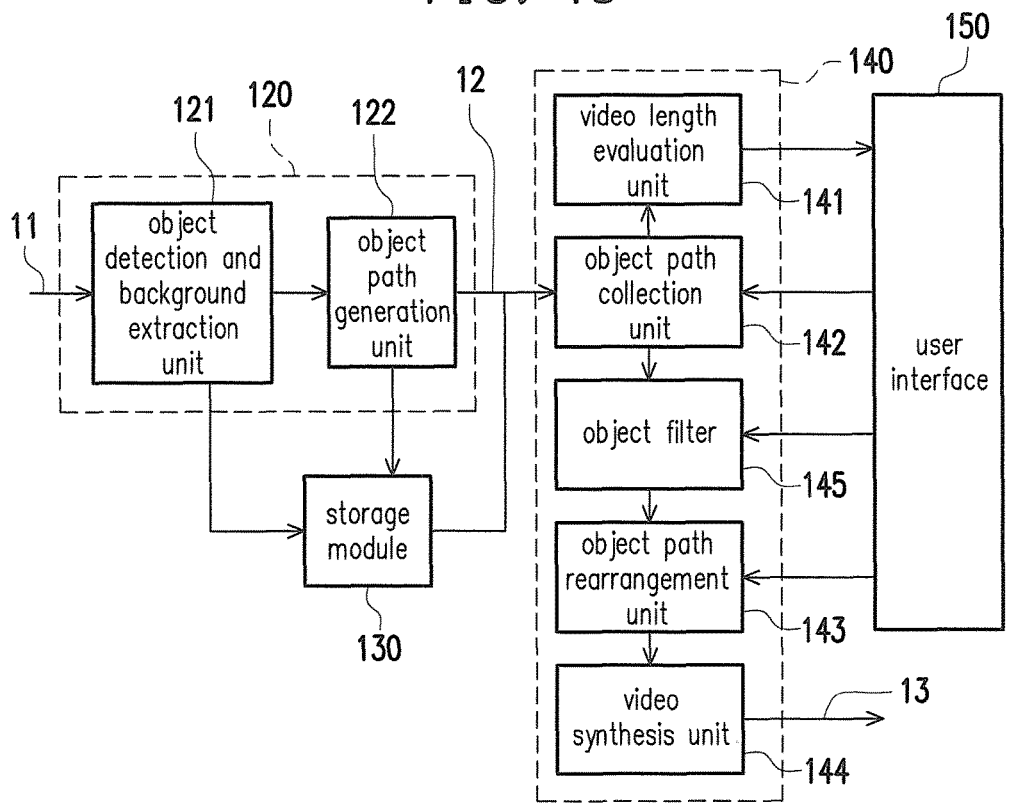
FIG. 14 is a schematic circuit block view illustrating a video synthesizing module shown in FIG. 1 according to another embodiment of the invention.

FIG. 14 is a schematic circuit block view illustrating the video synthesizing module 140 shown in FIG. 1 according to another embodiment of the invention. Details of the embodiment shown in FIG. 14 may be referred to the description about FIGS. 1-13. Therefore, the repeated contents will not be reiterated below. In the embodiment shown in FIG. 14, the video synthesizing module 140 further includes an object filter 145. The object filter 145 is coupled to the object path collection unit 142 to receive the outcome of collection of the object path collection unit 142. The user interface 150 shown in FIG. 14 may also be used to set parameters about an object property. When the user intends to look for an object according to its property, the object filter 145 may be used. Based on different purposes of application, the object property may include size, color, texture, material, face, movement direction, other physical properties or behaviors. The object filter 145 may filter and select the object paths provided by the object path collection unit 142 according to the object property. The object filter 145 checks through each object path provided by the object path collection unit 142 to select the object path compliant with the object property. The selected object path may be a complete object path or a part of an object path. The object path selected by the object filter 145 is provided to the object path rearrangement unit 143. The object path rearrangement unit 143 may rearrange the object paths in the synthesis video 13 according to the sequence of presence of the object paths selected by the object filter 145 in the original video 11. Details of the path rearrangement unit 143 and the video synthesis unit 144 may be referred to relevant description in FIG. 3. Therefore, the repeated contents will be reiterated below.

Figure 15:
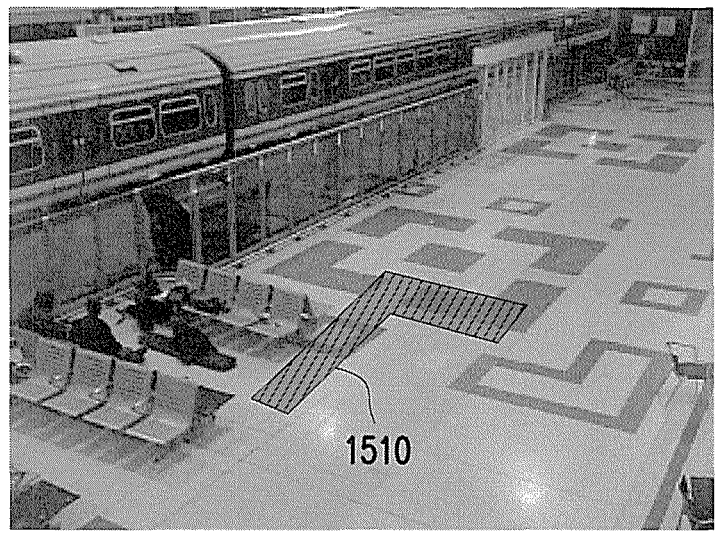
FIG. 15 is scene (original video) shoot by the camera module.

In other embodiments, the user can define at least one reference target in the original video 11 through the user interface 150. The at least one reference target comprises at least one of a point, a line, and an area in the original video 11. The object path collection unit 142 of the video synthesizing module 140 can filter and select the at least one object path 12 according to the at least one reference target. For example, FIG. 15 is scene (original video 11) shoot by the camera module 110. Refer to FIGS. 3 and 15, the user can define a reference target 1510 in the original video 11 through the user interface 150. The user interface 150 may transmit a start time $T_b$ and an end time $T_e$ input by the user to the video synthesizing module 140. The user may determine a time range of viewing objects in the original video 11 by setting of the start time $T_b$ and the end time $T_e$. After deciding the time range and the reference target 1510 of the original video 11 to be viewed, the video synthesizing module 140 may synthesize the object path belonging to the time range and the reference target 1510 to the synthesis video 13.

The object detection and background extraction 121 extracts at least one object in the original video 11. The object path generation unit 122 receives output of the object detection and background extraction 121, and combines the related objects to form the object path 12.

The object path collection unit 142 may collect a part or all of the object paths from the object paths stored in the storage module 130 according to the start time $T_b$, the end time $T_e$ and/or the reference target 1510. Given that the occurrence time and the time length of an object path in the storage module 130 are respectively referred to as $P_t$ and Pl. The object path collection unit 142 can choose a candidate object path in the storage device (the storage module 130) if ($T_b \leq P_t \leq T_e$), or ($T_b \leq P_t + P_l \leq T_e$), or ($P_t \leq T_b$ and $T_e \leq P_t + P_l$). The object path collection unit 142 can choose $k^{th}$ frame to $(k+n)^{th}$ frame of the candidate object path as the object path that draws the user's interest if the object of the candidate object path contact with the reference target 1510 in the $k^{th}$-$(k+n)^{th}$ frames.

Figure 16:
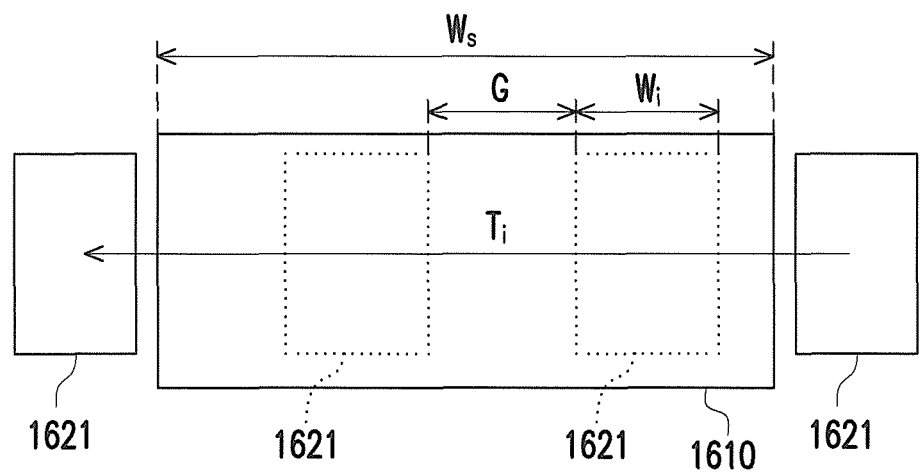
FIG. 16 is schematic views illustrating the synthesis video comprising multiple sub-videos respectively including the object paths according to another embodiment of the invention.
Figure 17:
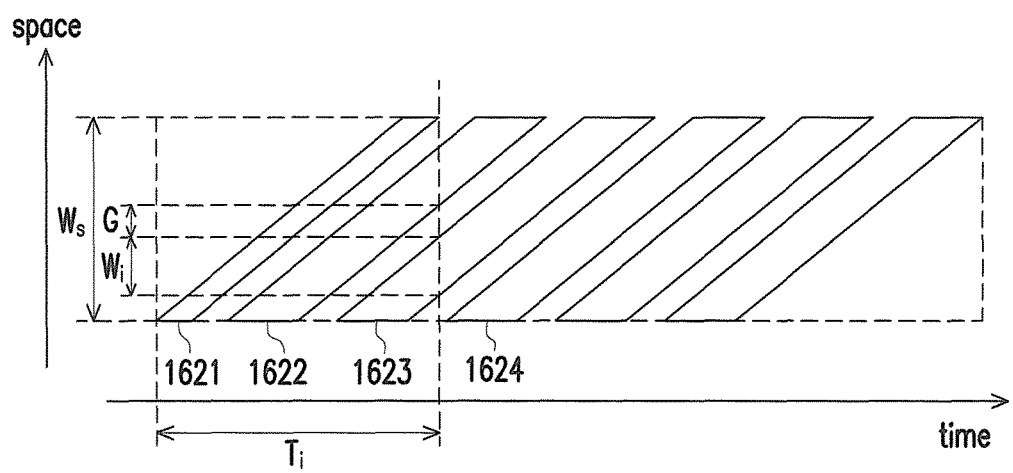
FIG. 17 is schematic views illustrating the synthesis video of FIG. 16 according to another embodiment of the invention.

The object path rearrangement unit 143 may rearrange the object paths in the synthesis video 13 according to the sequence of presence of the object paths selected by the object path collection unit 142. For example, FIG. 16 is schematic views illustrating the synthesis video 13 comprising multiple sub-videos respectively including the object paths selected by the object path collection unit 142 according to another embodiment of the invention. FIG. 17 is schematic views illustrating the synthesis video of FIG. 16 according to another embodiment of the invention. In FIG. 17, a vertical axis indicates space (a position of an object) in the synthesis video 13, while a horizontal axis indicates time. The synthesis video 13 may comprise multiple sub-videos respectively including the object path selected by the object path collection unit 142. In the embodiment of FIG. 16, each of the sub-videos 1621, 1622, 1623 and 1624 respectively includes the object path which has object contacting with the reference target (e.g., reference target 1510 in FIG. 15). The object path rearrangement unit 143 scrolls the sub-videos 1621, 1622, 1623 and 1624 from right to left in a scroll 1610 of the synthesis video 13. In other embodiment, the sub-videos 1621, 1622, 1623 and 1624 may be scrolled from left to right (or from right to left, or from up to down, or from down to up) in a scroll 1610. In other embodiment, the synthesis video 13 further comprises the time stamp of the object paths selected by the object path collection unit 142.

In one embodiment, the object path rearrangement unit 143 further performs "object path size equalization", "object path scrolling speed equalization" and/or "object path rearrangement". The "object path size equalization" is used for adjusting the size of the sub-videos 1621, 1622, 1623 and 1624. For example, the object path rearrangement unit 143 equalizes the width of frame of each of object paths. The object path rearrangement unit 143 further equalizes the height of frame of each of object paths. In other embodiments, the size of the sub-videos 1621, 1622, 1623 and 1624 may be different from each other.

The "object path scrolling speed equalization" is used for adjusting the playback speed of the object path in the scroll 1610. As shown in FIG. 16, the playback speed (scrolling speed) of the scroll 1610 is S, the width of the scroll 1610 is $W_s$, the width of a $i^{th}$ object path among the object paths selected by the object path collection unit 142 is $W_i$, and the playback time length $T_i$ of the $i^{th}$ object path in the scroll 1610 is $$T_i = \frac{W_s + W_i}{S}.$$

If the frame rate of the $i^{th}$ object path is Fr, the frame number $F_i$ of the $i^{th}$ object path is $F_i = Fr \times T_i$. By increasing or decreasing the number of frames of the object paths, the playback speed of the object paths can be adjusted.

After "object path size equalization" and "object path scrolling speed equalization", the object path rearrangement unit 143 can arrange the object paths.

The video synthesis unit 144 may synthesize the object paths provided by the object path rearrangement unit 143 into the scroll 1610 to form the synthesis video 13. The video synthesis unit 144 may copy a partial image of the object path in the original video 11, and the partial image is affixed to the location of the corresponding frame in the scroll 1610. All frames of all object paths apply this method to produce the scroll 1610 of the synthesis video 13.

The video length evaluation unit 141 may estimate a suggested time length $T_s$ based on the object paths collected by the object path collection unit 142 according to playback speed S of the scroll 1610 and width $W_s$ of the scroll 1610 provided by the user interface 150. The video length evaluation unit 141 can calculate the suggested time length $T_s$ with an equation $$T_s = \frac{W_s + G \times (N-1) + \sum_{i=1}^{N} W_i}{S},$$

wherein G indicates a gap between two sub-videos of the sub-videos in the scroll 1610, N indicates the number of the object path that draws the user's interest, and $W_i$ indicates a width of a $i^{th}$ object path among the object paths that draws the user's interest.

It should be noted that, related functionalities of the camera module 110, the object path extraction module 120, the storage module 130, the video synthesizing module 140, the user interface 150, and/or the display module 160 may be achieved by using general programming languages (e.g. C or C++), hardware description languages (e.g. Verilog HDL or VHDL) or other suitable programming languages. The resulting software may be disposed to any known computer-accessible medias, such as magnetic tapes, semiconductors, magnetic disks or compact disks (e.g. CD-ROM or DVD-ROM), or may be transmitted through Internet, wired communication, wireless communication or other communication media, and used by the computer to gain an access to the programming codes.

What is claimed is:

1. A video playback method, comprising:
providing an original video, wherein the original video is obtained by using a camera module to shoot a scene;
providing, by a user, a playback time length to determine a time length of a synthesis video, wherein the time length of the synthesis video is less than a time length of the original video;
extracting at least one object path from the original video;
adjusting the at least one object path selectively to synthesize the at least one object path to the synthesis video;
calculating a suggested time length according to crowdedness of the at least one object path at different pixels in a scene;
providing the suggested time length to a user to assist the user in deciding the playback time length;
generating a crowdedness map according to the original video to describe crowdedness values of the at least one object path at different pixels;
calculating with an equation $$F_n = \left\lceil \frac{C_m}{C_{th}} \right\rceil,$$

wherein $F_n$ indicates a suggested number of frames, $C_m$ indicates an associated value of the crowdedness values, and $C_{th}$ indicates a threshold value; and
calculating with an equation $$T_p = \left\lceil \frac{F_n}{R_f} \right\rceil,$$

wherein $T_p$ indicates the suggested time length, and $R_f$ indicates a frame rate of the synthesis video,
wherein the associated value $C_m$ is an average value of the crowdedness values of all pixels in the crowdedness map, and the threshold value $C_{th}$ is greater than 0 and less than the associated value $C_m$; or the associated value $C_m$ is an average value of a range which is top 10% to top 50% of the crowdedness values of the crowdedness map.

2. The video playback method as claimed in claim 1, wherein the at least one object path comprises a first object path and a second object path, and a playback speed of the first object path is different from a playback speed of the second object path in the synthesis video.

3. The video playback method as claimed in claim 1, wherein the at least one object path comprises a first object path and a second object path, and a temporal position of a first object of the first object path in the original video and a temporal position of a second object of the second object path in the original video are not overlapped, and temporal positions of the first object and the second object in the synthesis video are overlapped, wherein a spatial position of the at least one object path in the synthesis video is the same as a spatial position of the at least one object path in the original video.

4. The video playback method as claimed in claim 1, wherein the step of extracting the at least one object path from the original video comprises:
performing an object detection to extract at least one object from the original video;
creating the at least one object path based on a relation between the at least one object in a current frame of the original video and the at least one object in a previous frame of the original video; and
storing the at least one object path in a storage device.

5. The video playback method as claimed in claim 4, wherein the step of creating the at least one object path comprises:
creating a new object path when the object in the current frame does not have a parent object in the previous frame, or when the object in the current frame shares the parent object with another object, or when the object in the current frame has a plurality of the parent objects, wherein the object in the current frame is a first object of the new object path;
adding the object in the current frame to a currently available object path that the parent object belongs to when the object in the current frame has the only parent object, and the object in the current frame is a only child object of the parent object; and
ending the at least one object path when a last object of the at least one object path does not have a child object, or when the last object of the at least one object path has more than one child objects, or when the last object of the at least one object path shares a child object with another object path.

6. The video playback method as claimed in claim 4, wherein the at least one object path comprises following data: a time length of the at least one object path, a time stamp of a first object on the at least one object path, a time shift of each object on the at least one object path with respect to the first object, a position of each object, a size of each object, or a parent object path.

7. The video playback method as claimed in claim 4, further comprising:
providing a start time $T_b$ and an end time $T_e$ of the original video; and
choosing a candidate object path in the storage device as the at least one object path if $T_b \leq P_t \leq T_e$, or $T_b \leq P_t + P_l \leq T_e$, or ($P_t \leq T_b$ and $T_e \leq P_t + P_l$), wherein $P_t$ and $P_l$ are respectively the time of occurrence of the candidate object path and length of the candidate object path.

8. The video playback method as claimed in claim 4, further comprising:
defining at least one reference target in the original video; and
filtering and selecting the at least one object path according to the at least one reference target.

9. The video playback method as claimed in claim 8, wherein the at least one reference target comprises at least one of a point, a line, and an area in the original video.

10. The video playback method as claimed in claim 8, wherein the step of filtering and selecting the at least one object path comprises:
providing a start time $T_b$ and an end time $T_e$ of the original video;
choosing a candidate object path in the storage device if $T_b \leq P_t \leq T_e$, or $T_b \leq P_t + P_l \leq T_e$, or ($P_t \leq T_b$ and $T_e \leq P_t + P_l$), wherein $P_t$ and $P_l$ are respectively the time of occurrence of the candidate object path and length of the candidate object path; and
choosing at least one frame of the candidate object path as the at least one object path if the object of the candidate object path contact with the at least one reference target in the at least one frame.

11. The video playback method as claimed in claim 1, further comprising:
providing an object property; and
filtering and selecting the at least one object path according to the object property,
wherein the object property comprises size, color, texture, material, face, movement direction, or behavior, and the step of adjusting the at least one object path selectively to synthesize the at least one object path to the synthesis video comprises:
rearranging the at least object path in the synthesis video according to a sequence of presence of the at least one object path in the original video; and
synthesizing the at least one object path to generate the synthesis video.

12. The video playback method as claimed in claim 11, wherein the step of rearranging the at least one object path in the synthesis video comprises:
adjusting the at least one object path selectively to obtain at least one adjusted object path;
initializing a temporal position of the at least one adjusted object path in the synthesis video according to the sequence of presence of the at least one object path in the original video; and
adjusting the temporal position of the at least one adjusted object path in the synthesis video according to overlapping of the at least one adjusted object path in the synthesis video.

13. The video playback method as claimed in claim 12, wherein the step of obtaining the at least one adjusted object path comprises:
combining the at least one object path and a parent object path to serve as the at least one adjusted object path when the at least one object path has the parent object path;
speeding up a playback speed of the at least one object path according to a speedup factor when a time length of the at least one object path is greater than a threshold length, so as to reduce the time length of the at least one object path and serve as the at least one adjusted object path, wherein the threshold length is less than or equal to the playback time length, and the speedup factor is a real number; and
dividing the at least one object path into a plurality of sub-paths to serve as the at least one adjusted object path when the time length of the at least one object path is greater than the threshold length.

14. The video playback method as claimed in claim 13, wherein the speedup factor $S_p = (P_l / P_{th})$, wherein $P_l$ is the time length of the at least one object path, and $P_{th}$ indicates the threshold length; when the speedup factor $S_p$ is greater than a maximal speedup value $S_{max}$, the speedup factor $S_p$ is set at the maximal speedup value $S_{max}$, the maximal speedup value $S_{max}$ being greater than 1 and less than 4; and when the speedup factor $S_p$ is less than 1, the speedup factor $S_p$ is set at 1.

15. The video playback method as claimed in claim 13, when a representative crowdedness value $C_p$ of the at least one object path in a crowdedness map is greater than or equal to a crowdedness upper limit $C_U$, the speedup factor $S_p$ is set at a maximal speedup value $S_{max}$, wherein the crowdedness upper limit $C_U$ and the maximal speedup value $S_{max}$ being real numbers; when the representative crowdedness value $C_p$ is less than or equal to a crowdedness lower limit $C_L$, the speedup factor $S_p$ is set at 1, wherein the crowdedness lower limit $C_L$ being a real number less than the crowdedness upper limit $C_U$; and when the representative crowdedness value $C_p$ is greater than the crowdedness lower limit $C_L$ and less than the crowdedness upper limit $C_U$, the speedup factor $S_p$ is set at a value of $[(C_p - C_L)/(C_U - C_L)] * (S_{max} - 1) + 1$.

16. The video playback method as claimed in claim 13, wherein the step of dividing the at least one object path into the plurality of sub-paths comprises:
adjusting a frame shift of a first sub-path of the sub-paths to other sub-path of the sub-paths to reduce an overlapped area of the sub-paths.

17. The video playback method as claimed in claim 12, wherein the step of initializing the temporal position of the at least one adjusted object path in the synthesis video comprises:
advancing the time of the later one of a first object path and a second object path when there is a gap in time between the first object path and the second object path in the at least one adjusted object path, wherein the time of the later one is later than the time of the earlier one of the first object path and the second object path; and
multiplying a time shift of the at least one adjusted object path with an adjustment value respectively, such that a time range of the at least one adjusted object path is less than or equal to a range of the playback time length.

18. The video playback method as claimed in claim 1, wherein the synthesis video comprises multiple sub-videos respectively including the at least one object path, and the sub-videos are scrolled in a direction in a scroll of the synthesis video.

19. The video playback method as claimed in claim 18, further comprising:

calculating with an equation $$T_s = \frac{W_s + G \times (N-1) + \sum_{i=1}^{N} W_i}{S},$$

wherein $T_s$ indicates a suggested time length, $W_s$ indicates a width of the scroll, G indicates a gap between two sub-videos of the sub-videos in the scroll, N indicates the number of the at least one object path, $W_i$ indicates a width of a $i^{th}$ object path among the at least one object path, and S indicates a playback speed of the scroll.

* * * * *